US008408767B2

(12) United States Patent
Hamid et al.

(10) Patent No.: US 8,408,767 B2
(45) Date of Patent: Apr. 2, 2013

(54) AUTOMOTIVE HEADLAMP WITH STAIRCASE CIRCULATOR

(75) Inventors: Muhammed Aqil Hamid, Canton, MI (US); Steven M Barman, Canton, MI (US); Brett Deboodt, South Rockwood, MI (US); Gordon E Syerson, Rochester Hills, MI (US)

(73) Assignee: Ventra Sandusky LLC, Ontario (CA)

( * ) Notice: Subject to any disclaimer, the term of this patent is extended or adjusted under 35 U.S.C. 154(b) by 301 days.

(21) Appl. No.: 12/959,882

(22) Filed: Dec. 3, 2010

(65) Prior Publication Data

US 2012/0140500 A1 Jun. 7, 2012

(51) Int. Cl.
*B60Q 1/00* (2006.01)

(52) U.S. Cl. ......................... 362/507; 362/547; 362/546

(58) Field of Classification Search .................. 362/507, 362/547, 546, 548
See application file for complete search history.

(56) References Cited

U.S. PATENT DOCUMENTS

| | | | |
|---|---|---|---|
| 4,809,144 | A | 2/1989 | Suzuki |
| 6,595,672 | B2 | 7/2003 | Yamaguchi |
| 6,976,770 | B2 | 12/2005 | Trimpe et al. |
| 7,275,848 | B2 | 10/2007 | Chinniah et al. |
| 7,329,033 | B2 | 2/2008 | Glovatsky et al. |
| 7,427,152 | B2 | 9/2008 | Erion et al. |

*Primary Examiner* — Evan Dzierzynski
(74) *Attorney, Agent, or Firm* — Pepper Hamilton LLP

(57) ABSTRACT

A lighting system for an automotive vehicle has a housing adapted for mounting to the vehicle with a generally outward facing backplate and at least one socket for an incandescent light source. A transparent lens cover is attached to the housing and forms an internal chamber between the lens cover and the housing. A staircase circulator on the housing comprises a plurality of steps and risers rising from the backplate toward the lens cover along a path that is spaced from the socket, wherein the path is generally along a natural convection flow-path of air within the chamber.

10 Claims, 6 Drawing Sheets

AUTOMOTIVE HEADLAMP WITH STAIRCASE CIRCULATOR

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to headlamp assemblies for motor vehicles, and, more specifically, to housing structures for passively increasing air circulation.

Headlamp assemblies for motor vehicles typically include a housing and a lens cover creating a chamber that contains a light source, such as an incandescent lamp, a light emitting diode (LED), a high intensity discharge (HID) lamp, or a projection lamp, electrically connected to a power source. The chamber may also include a reflector surrounding the light source or the housing itself may be made reflective.

During operation of the light source (i.e., during illumination driven by the power source), heat is generated within the chamber which must be removed. In some designs, the chamber is hermetically sealed, while in other designs a vent is introduced in the housing. When a vent is used, a membrane or filter is typically required to remove contaminants and to reduce entry of moisture into the chamber which could cause condensation. Thermal management and condensation management are important design aspects for both sealed and vented lamps.

It is desirable to keep light sources cool during use and to maintain relatively constant temperature distribution throughout the chamber. Condensation is related to the partial pressure of water vapor in the air contained in the lamp. As the air is heated, the partial pressure of the water vapor increases. When the high pressure water vapor reaches a cold region, it expands and condensation occurs. In order to avoid hot or cold spots in the chamber, fans have sometimes been added to headlamp assemblies in order to circulate air within the chamber or within a passageway separated from the chamber by a wall. The fan results in added cost and reduced reliability of a headlamp system. Without a fan, however, circulation in conventional headlamp assemblies has been due only to density differences between hot and cold air. Insufficient mixing in conventional assemblies can increase condensation and prevent efficient heat removal from the headlamp.

SUMMARY OF THE INVENTION

In one aspect of the invention, a lighting system for an automotive vehicle comprises a housing adapted for mounting to the vehicle and having a generally outward facing backplate and at least one socket for an incandescent light source. A transparent lens cover is attached to the housing and forms an internal chamber between the lens cover and the housing. A staircase circulator on the housing comprises a plurality of steps and risers rising from the backplate toward the lens cover along a path that is spaced from the socket, wherein the path is generally along a natural convection flowpath of air within the chamber.

DETAILED DESCRIPTION OF PREFERRED EMBODIMENTS

Figure 1:
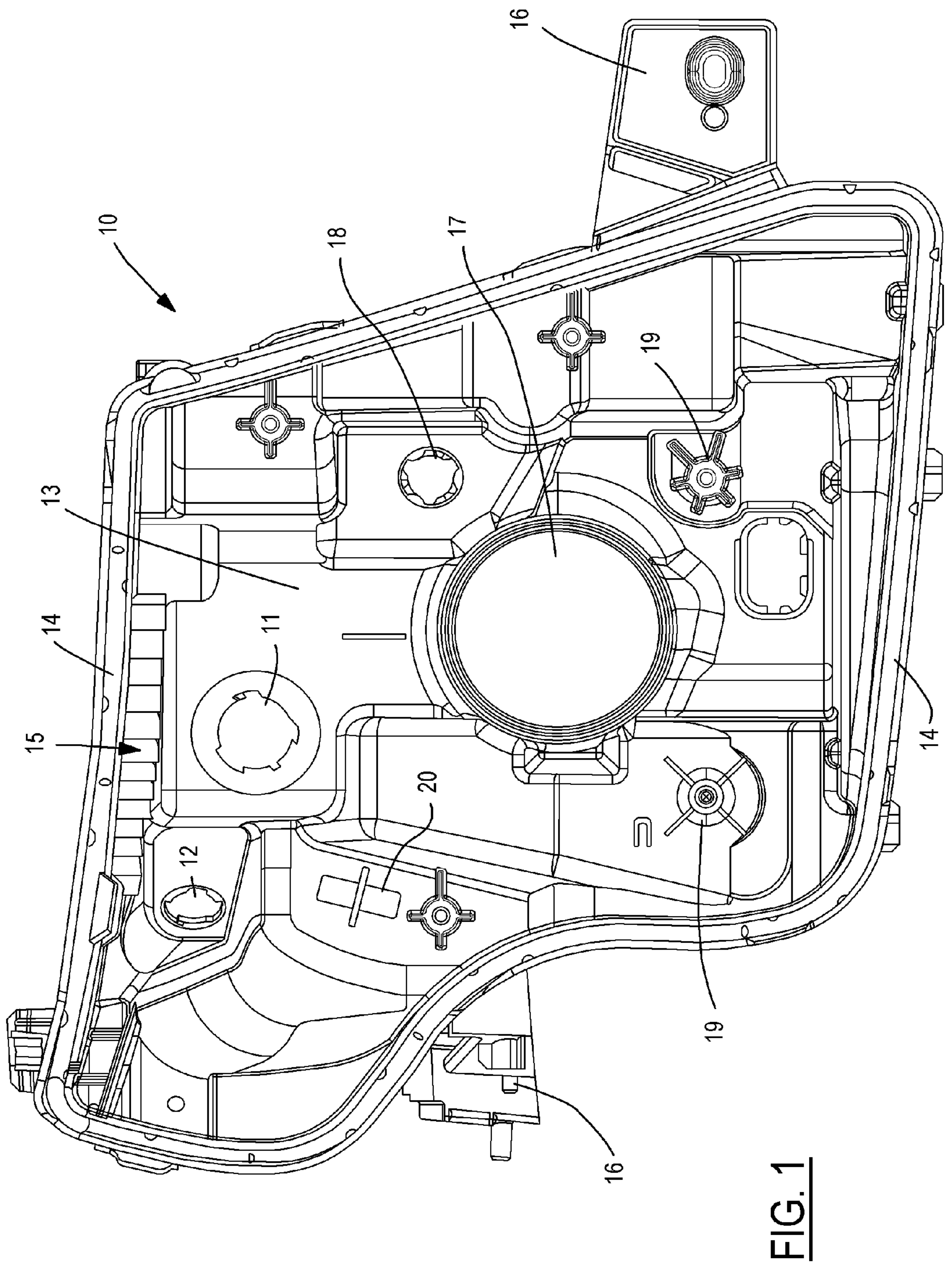
FIG. 1 is a front, plan view of a housing.

Referring now to FIG. 1, a housing 10 for an automotive headlamp assembly has a light socket 11 and a light socket 12 formed in a generally is outward-facing backplate 13. A groove 14 around the periphery of housing 10 is adapted for mounting a lens cover (not shown) by gluing or other means of attachment. Extending outwardly from backplate 13 is a staircase circulator 15 that is described in greater detail below.

Housing 10 is adapted to be mounted to the body of a vehicle via attachment brackets 16. A boot cap 17 is provided as an attachment point for a main light source and/or reflector. Lamp sockets 11 and 12 may be associated with signal or accessory lighting. A socket 18 is provided in housing 10 for receiving a headlamp adjuster mechanism, i.e., for controlling the direction of the headlight beam. Pivot bosses 19 work in concert with the adjuster as known in the art.

A vent hole 20 is provided in housing 10 to allow equalization of pressure during temperature cycling of the headlamp assembly resulting from heat generated by the various light sources operating in the headlamp assembly.

Figure 2:
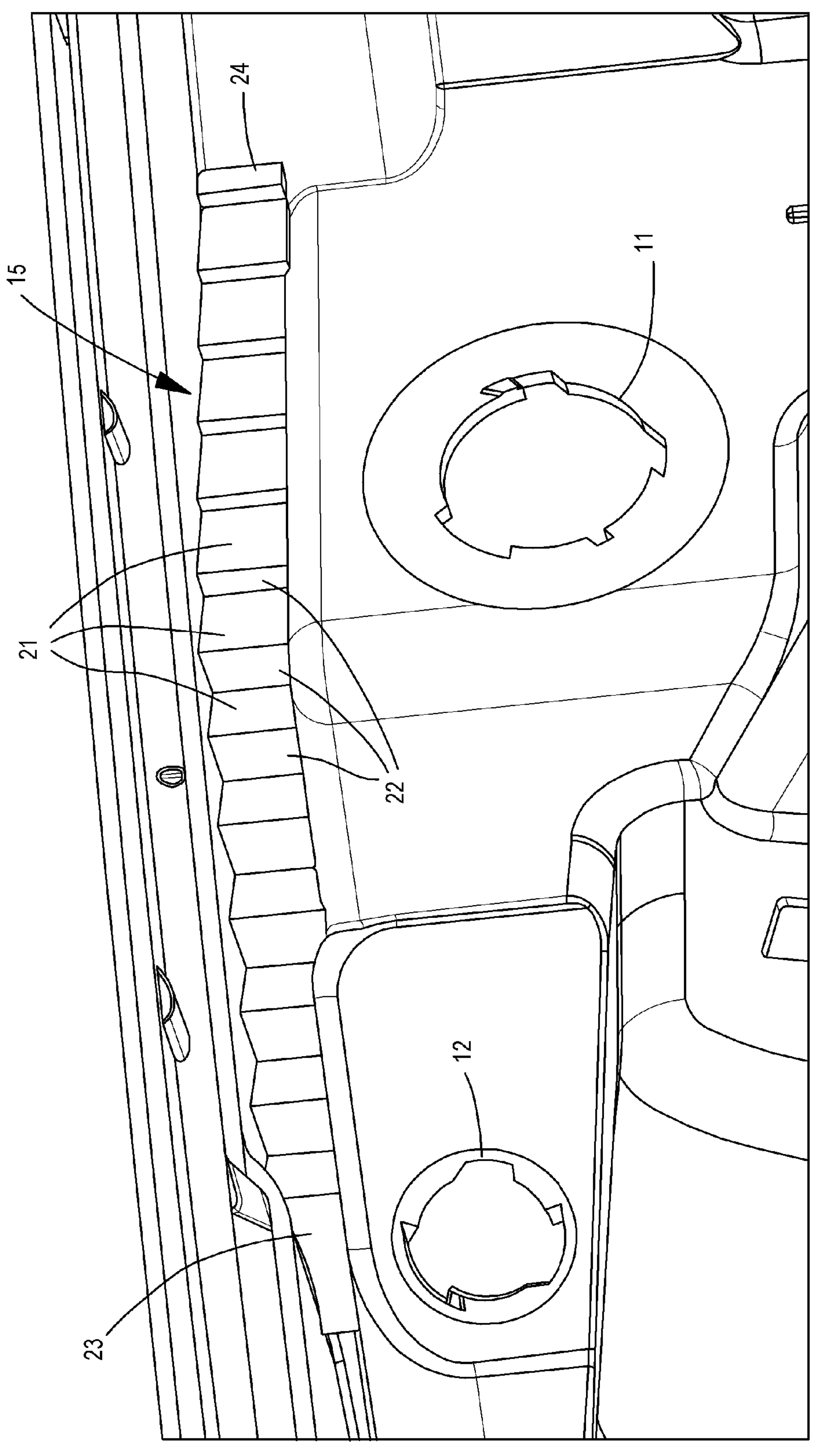
FIG. 2 is a perspective view of the staircase circulator of FIG. 1 in greater detail.

Staircase circulator 15 is shown in greater detail in FIG. 2. A plurality of steps 21 are alternately interconnected by risers 22 between a first end 23 and a second end 24. In the embodiment illustrated in FIGS. 1 and 2, housing 10 wraps around from the front of the vehicle to the side of the vehicle so that lamp sockets 11 and 12 are oriented in different directions. Staircase circulator 15 may generally follow the curved contour or it may rise up away from backplate 13.

Figure 3:
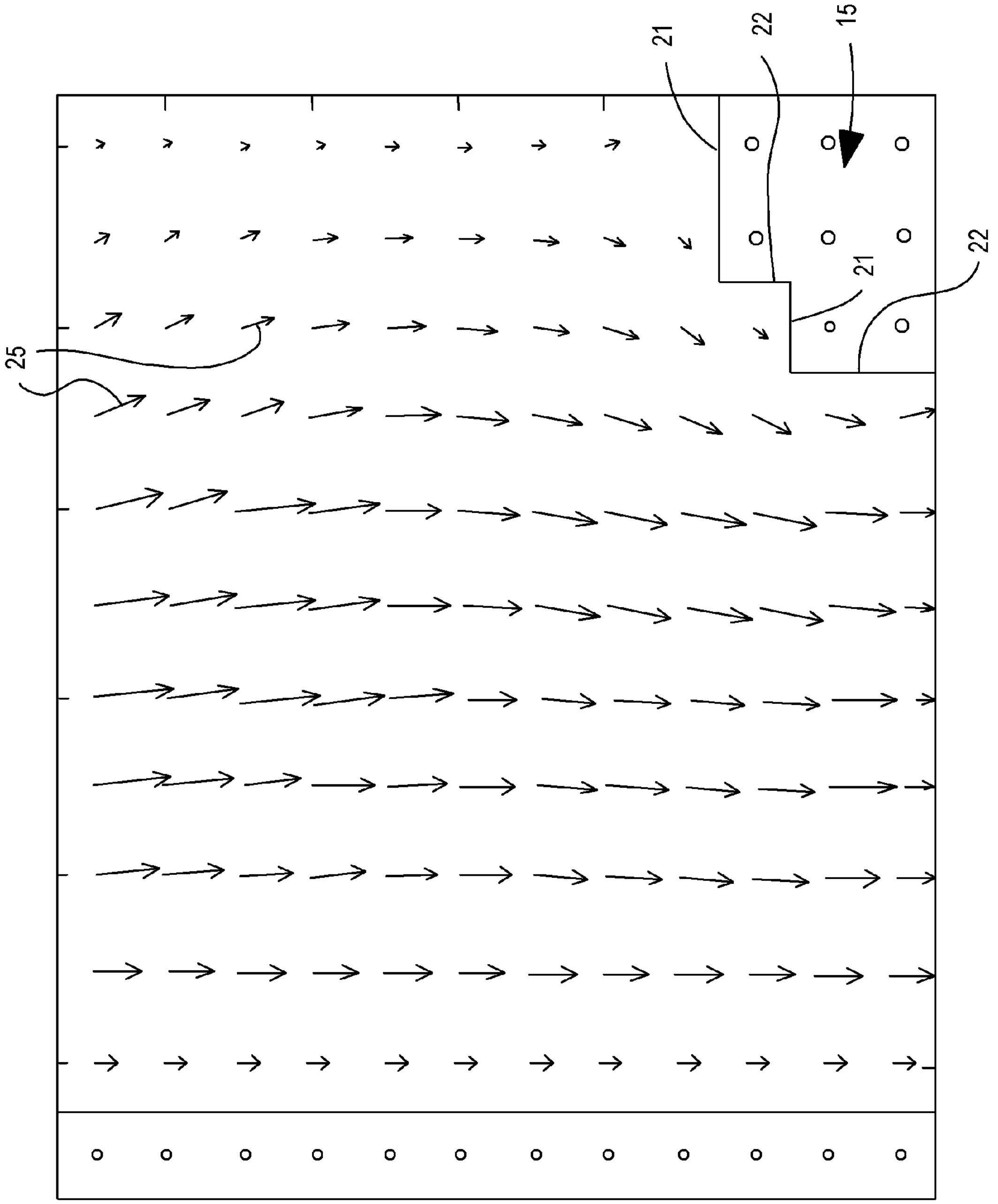
FIG. 3 is a plot showing air circulation.

As illustrated in FIG. 3, the staircase circulator changes the dynamics of the airflow allowing a designer to manipulate the convection of air in order to redistribute the circulating air in a manner that better equalizes temperatures across the headlamp system. Arrows 25 represent airflow vectors at various points within the headlamp chamber between the housing and lens cover. Due to the presence of staircase circulator 15, the airflow must pass over steps 21 and risers 22 as a result of natural convection. While flowing over step surfaces 21, the air flow moves at a relatively higher velocity. The higher velocity airstream lowers the pressure at the staircase circulator surfaces, and the lower pressure draws surrounding air toward the staircase circulator. By appropriate placement of the staircase circulator, the shape of the airflow is manipulated to increase both airflow and temperature flow in a desired direction or to a desired location to correct for imbalances in the natural convection in the chamber.

Figure 4:
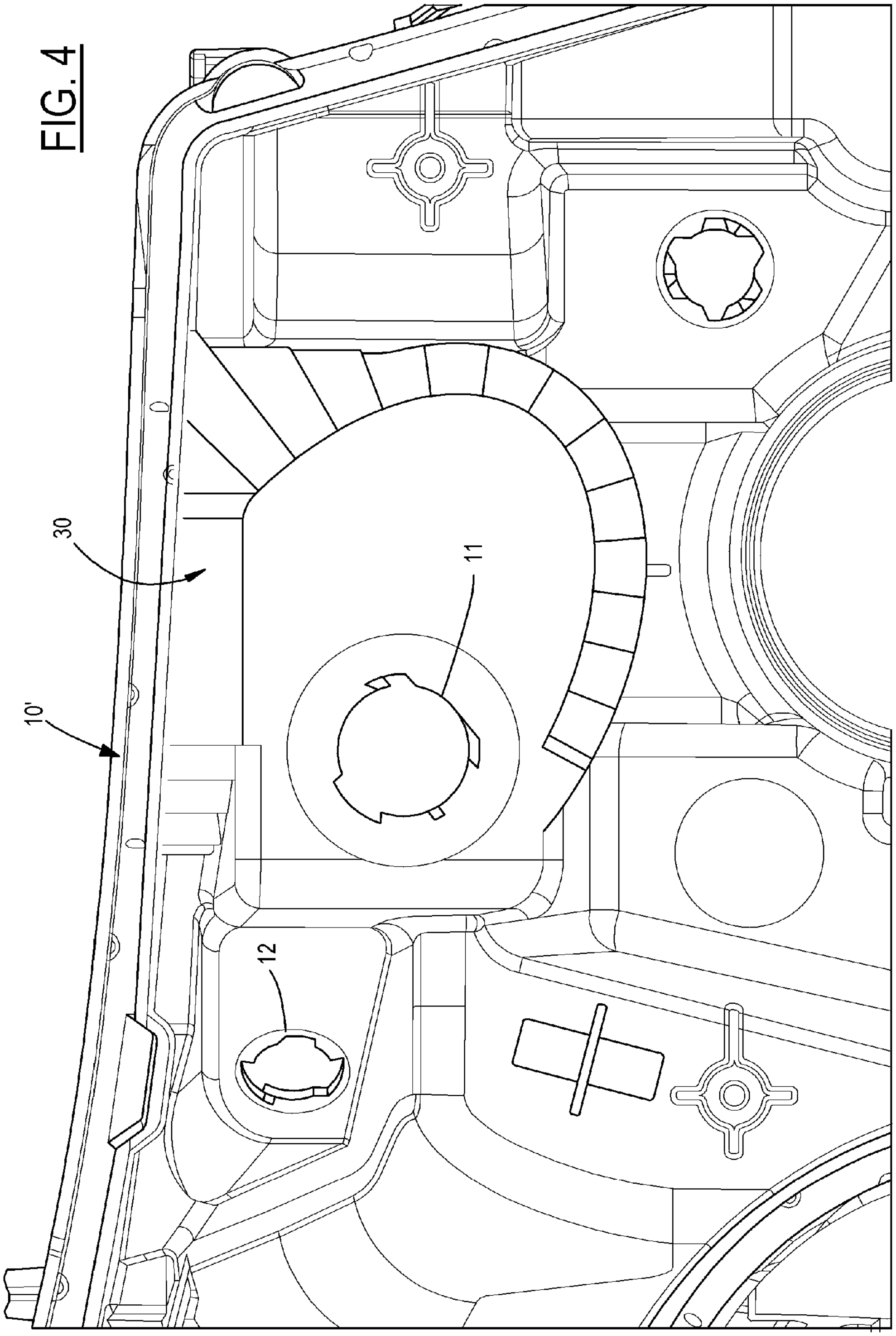
FIG. 4 is a front, plan view showing a portion of a housing having an alternative embodiment of the staircase circulator.
Figure 5:
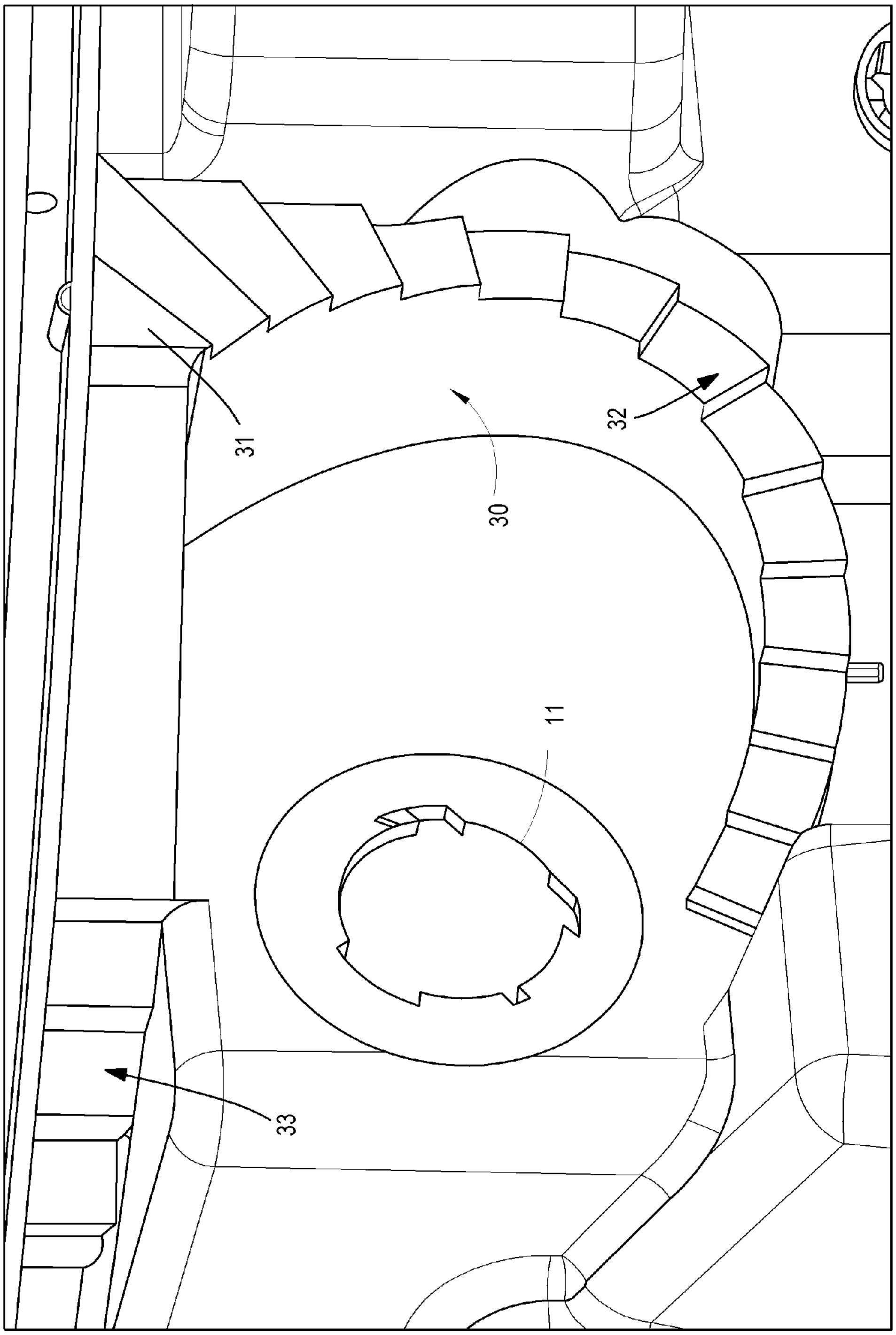
FIG. 5 is a perspective view of the staircase circulator of FIG. 4.

FIG. 4 shows an alternative embodiment wherein housing 10' includes a staircase circulator 30. Instead of a substantially straight path as shown in FIGS. 1 and 2, staircase circulator 30 follows a path that is curved with a substantially constant radius of curvature. As shown in the perspective views of FIGS. 5 and 6, curved staircase circulator 30 has first and second ends 32 and 33 that are arranged end to end and share a highest point 31. Each section may correspond to a different region of airflow within the chamber, for example.

Figure 6:
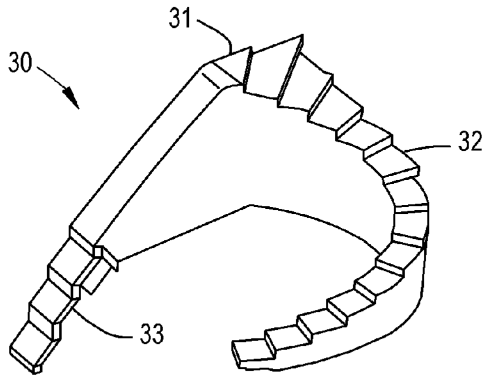
FIG. 6 is a perspective view of the staircase circulator of FIG. 4 formed as an element separate from the housing.
Figure 7:
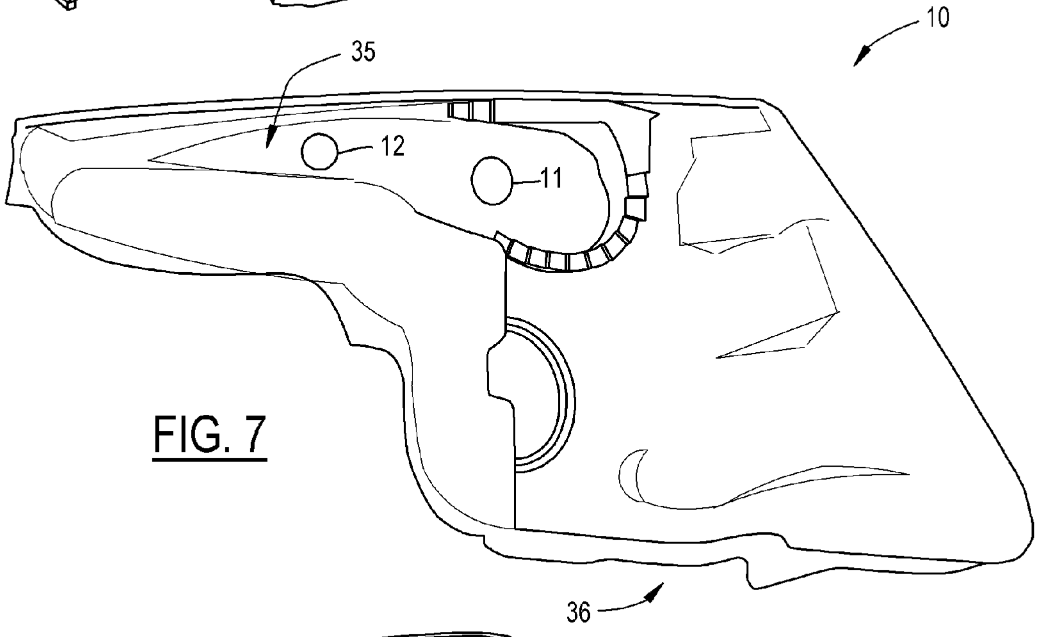
FIG. 7 is a side, perspective view of the housing.

As shown in FIG. 7, housing 10 has a front portion 36 facing in the forward direction of the vehicle, and wraps around to a side portion 35. Sockets 11 and 12 may accommodate signaling lights pointing in respective directions. As used herein, the backplate forms the base of the internal chamber of the headlamp and may be flat or curved. Housing 10 is preferably formed of a molded thermoplastic with the staircase circulator integrally molded with the backplate. Alternatively, the staircase circulator may be formed as a separate component to be attached to the backplate as shown in FIG. 6.

Figure 8:
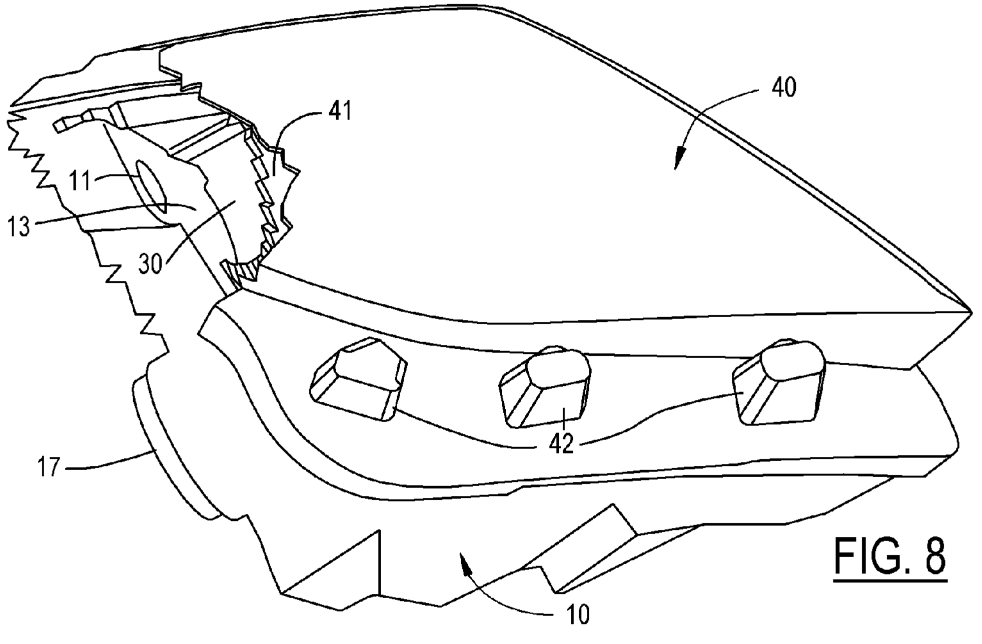
FIG. 8 is a perspective view of the housing of FIG. 7 with the inclusion of the lens cover.

FIG. 8 is a perspective view showing transparent lens cover 40 attached to s housing 10. Chamber 41 is created between transparent lens cover 40 and backplate 13. Staircase circulator 30 rises from backplate 13 toward lens cover 40 along a path that is spaced from the lamp sockets such as 11 and 17. Bosses 42 on lens cover 40 are holders for attaching with a facia.

The invention may include one or more distinct staircase circulators formed on the headlamp housing. After the general shape of a lamp housing and lens cover have been selected early in a design process, temperature generation and air circulation are simulated based on the selected shapes without the presence of a staircase circulator. The temperature distribution and airflow directions are observed in the simulation and then one or more staircase circulators are placed in appropriate is locations to draw airflow into regions that assist in equalizing overall temperatures.

Thus, in a preferred method of the invention, a shape of the housing is configured including at least one socket for a light source in a generally outward-facing backplate, wherein the backplate lacks a staircase circulator. A shape of the transparent lens cover is configured for attaching to the housing to form an internal chamber between the lens cover and the housing. A convective airflow pattern is simulated within the chamber resulting from operation of the light source. Regions of relatively stagnant flow are identified within the convective airflow pattern. A path and profile of a staircase circulator are configured for interacting with the simulated convective airflow pattern in order to reduce the region of stagnant flow. The path of the staircase circulator may be substantially aligned with the region of stagnant flow. The profile of the staircase circulator is comprised of a plurality of steps and risers rising from the backplate toward the lens cover along a path that is spaced from the socket. The path may be substantially straight, curved with a substantially constant radius of curvature, or otherwise curved or serpentine in any manner necessary to redirect the air circulation as desired.

The foregoing description utilizes a staircase circulator as an integral part of a headlamp housing operating passively, without moving parts, and without any significant added cost while distributing air within the chamber to reduce hot or cold spots and obtaining results previously obtained only by the added cost and reduced reliability associated with a fan.

What is claimed is:

1. A lighting system for an automotive vehicle, comprising:

a housing adapted for mounting to the vehicle and having a generally outward facing backplate and at least one socket for a light source;

a transparent lens cover attached to the housing and forming an internal chamber between the lens cover and the housing; and a staircase circulator comprising a plurality of steps and risers rising from the backplate toward the lens cover along a path that is spaced from the socket, wherein the path is generally along a natural convection flowpath of air within the chamber.

2. The system of claim 1 wherein the staircase circulator is integrally formed with the housing.

3. The system of claim 1 wherein the path is substantially straight.

4. The system of claim 1 wherein the path is curved with a substantially constant radius of curvature.

5. The system of claim 1 wherein the staircase circulator has first and second sections arranged end-to-end and sharing a highest point.

6. The system of claim 1 wherein the housing includes a vent hole in the backplate.

7. A method of enhancing natural air circulation within a lighting system for an automotive vehicle, comprising the steps of:

configuring a shape of a housing including at least one socket for a light source in a generally outward facing backplate, wherein the backplate lacks a staircase circulator;

configuring a shape of a transparent lens cover for attaching to the housing to form an internal chamber between the lens cover and the housing;

simulating a convective airflow pattern within the chamber resulting from operation of the light source;

identifying a region of stagnant flow within the convective airflow pattern;

configuring a path and profile of a staircase circulator for interacting with the convective airflow pattern to reduce the region of stagnant flow, wherein the path is aligned with the region of stagnant flow and wherein the profile is comprised of a plurality of steps and risers rising from the backplate toward the lens cover along a path that is spaced from the socket.

8. The method of claim 7 wherein the path is substantially straight.

9. The method of claim 7 wherein the path is curved with a substantially constant radius of curvature.

10. The method of claim 7 wherein the profile comprises first and second sections arranged end-to-end and sharing a highest point.

* * * * *